United States Patent
Morais et al.

(10) Patent No.: US 7,490,237 B1
(45) Date of Patent: Feb. 10, 2009

(54) SYSTEMS AND METHODS FOR CACHING IN AUTHENTICATION SYSTEMS

(75) Inventors: Dinarte R. Morais, Redmond, WA (US); Ling Tony Chen, Bellevue, WA (US); Mark D. VanAntwerp, Redmond, WA (US); Boyd C. Multerer, Seattle, WA (US); Gary A. Thompson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 10/608,653

(22) Filed: Jun. 27, 2003

(51) Int. Cl.
*H04L 9/32* (2006.01)
*H04L 9/00* (2006.01)

(52) U.S. Cl. ............... 713/170; 713/181; 713/166; 726/5

(58) Field of Classification Search ............ 713/161, 713/168, 170, 181; 726/2, 21, 27–29, 5
See application file for complete search history.

(56) References Cited

U.S. PATENT DOCUMENTS

| | | | | |
|---|---|---|---|---|
| 5,633,931 A * | 5/1997 | Wright | | 713/161 |
| 6,161,181 A * | 12/2000 | Haynes et al. | | 713/170 |
| 6,272,632 B1 * | 8/2001 | Carman et al. | | 713/168 |
| 6,468,160 B2 | 10/2002 | Eliott | | |
| 6,668,283 B1 * | 12/2003 | Sitaraman et al. | | 709/229 |
| 6,712,704 B2 | 3/2004 | Eliott | | |
| 6,769,989 B2 | 8/2004 | Smith et al. | | |
| 6,952,781 B1 * | 10/2005 | Chang et al. | | 726/4 |
| 7,069,435 B2 * | 6/2006 | Sandhu et al. | | 713/155 |
| 7,100,047 B2 * | 8/2006 | Stamos et al. | | 713/165 |
| 7,216,236 B2 * | 5/2007 | Kou et al. | | 713/183 |
| 2003/0126464 A1 * | 7/2003 | McDaniel et al. | | 713/201 |
| 2003/0172269 A1 * | 9/2003 | Newcombe | | 713/168 |
| 2003/0172270 A1 * | 9/2003 | Newcombe et al. | | 713/168 |
| 2004/0049678 A1 * | 3/2004 | Walsmley et al. | | 713/168 |
| 2004/0049702 A1 * | 3/2004 | Subramaniam et al. | | 713/201 |
| 2004/0162137 A1 | 8/2004 | Eliott | | |
| 2004/0205248 A1 * | 10/2004 | Little et al. | | 709/246 |
| 2004/0247131 A1 * | 12/2004 | Buer | | 380/278 |

OTHER PUBLICATIONS

Wang Xue-yan, Chen Qian-bin, "HASH Function Implementation of the Integrity of Data in WAP's WTLS," Journal of Chongqing University of Posts and Telecommunications, Jun. 2002, vol. 14, No. 2, pp. 57-61., China.

Hajime Watanabe, Toru Fujiwara, Tadao Kasami, "An Improved Method for Formal Security Verification of Crytographic Protocols," IEICE Trans. Fundamentals, Jul. 1996, vol. E79-A, No. 7, pp. 1089-1096, Japan.

(Continued)

*Primary Examiner*—Emmanuel L. Moise
*Assistant Examiner*—Zachary A Davis
(74) *Attorney, Agent, or Firm*—Lee & Hayes, PLLC

(57) ABSTRACT

A process for requesting authentication includes transmitting a hash digest formed from first client-specific data together with second client specific data and receiving, in response to transmitting, an indication of acceptance when the hash digest and second client-specific data correspond to a valid client authentication request.

21 Claims, 7 Drawing Sheets

OTHER PUBLICATIONS

Sead Muftic, Morris Sloman, "Security architecture for distributed systems," Computer Communications, Jul. 1994, vol. 17, No. 7, pp. 492-500, Butterworth-Heinemann Ltd., United Kingdom.

Ian Downnard, "Public-key crytography extensions into Kerberos," IEEE Potentials, Dec. 2002/Jan. 2003, pp. 30-34, The Institute of Electrical and Electronics Engineers, Inc., New York.

Cheolhyun Kim, Ilyong Chung, "An Efficient Kerberos Authentication Mechanism Associated with X.509 and DNS (Domain Name System)," IEICE Trans. Inf. & Syst., Sep. 2002, vol. E85-D, No. 9, pp. 1384-1389, Japan.

Naomaru Itoi, Tomoko Fukuzawa, Peter Honeyman, "Secure Internet Smartcards," Java Card 2000, LNCS 2041, pp. 73-89, 2001, Springer-Verlag Berlin Heidelberg.

Stelvio Cimato, "Design of an Authentication Protocol for Gsm Javacards," ICICS 2001, LNCS 2288, pp. 355-368, 2002, Springer-Verlag Berlin Heidelberg.

Ed Dawson, Andrew Clark, Mark Looi, "Key management in a non-trusted distributed environment," Future Generation Computer Systems 16 (2000), pp. 319-329, Elsevier Science B.V.

O. Elkeelany, M. M. Matalgah, K. P. Sheikh, M. Thaker, G. Chaudhry. D. Medhi, J. Qaddour, "Performance Analysis of IPSec Protocol: Encryption and Authentication," 2002 IEEE International Conference on Communications, pp. 1164-1168.

Olga Kornievskaia, Peter Honeyman, Bill Doster, Kevin Coffman, "Kerberized Credential Translation: A Solution to Web Access Control," 10th USENIX Security Symposium, pp. 235-248, USENIX Association, 2001.

Ding Yi-fan, et al., "Study of access control technologies and system in Extranet," Computer Integrated Manufacturing Systems, vol. 7, No. 1, Jan. 2001, pp. 7-15, China.

Wang Heng, Sun Ye-min, Zhang Kun, "Self-Organized Network and Study of its Security," Mini-Micro System, vol. 23, No. 2, Feb. 2002, pp. 214-217, China.

* cited by examiner

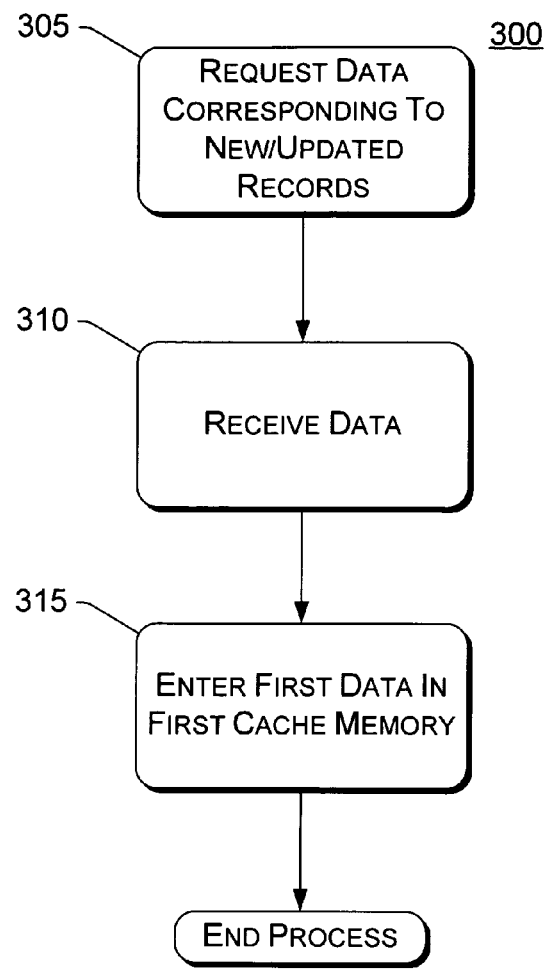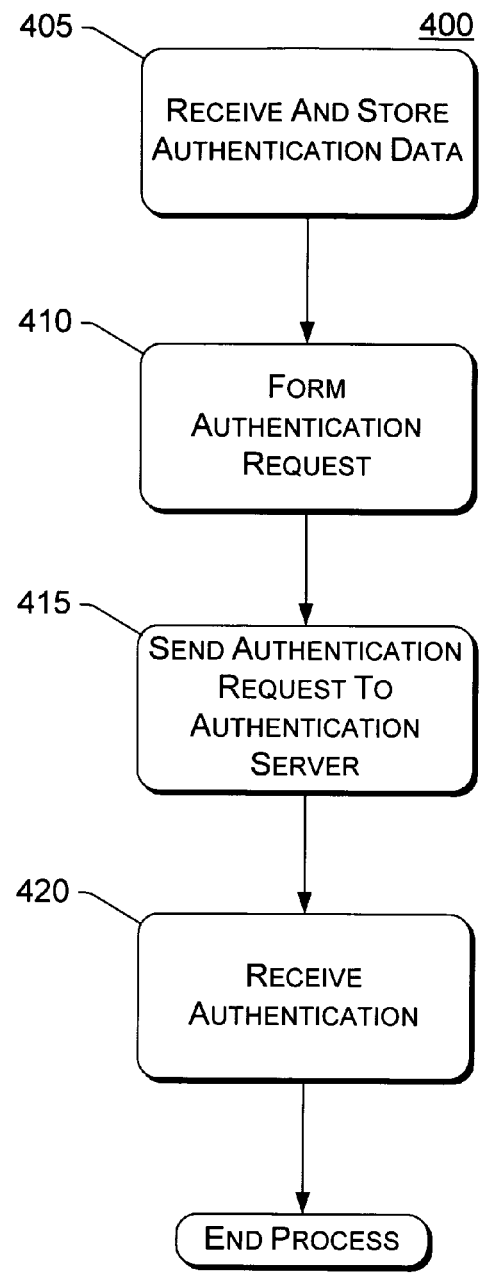
Fig. 3
Fig. 4

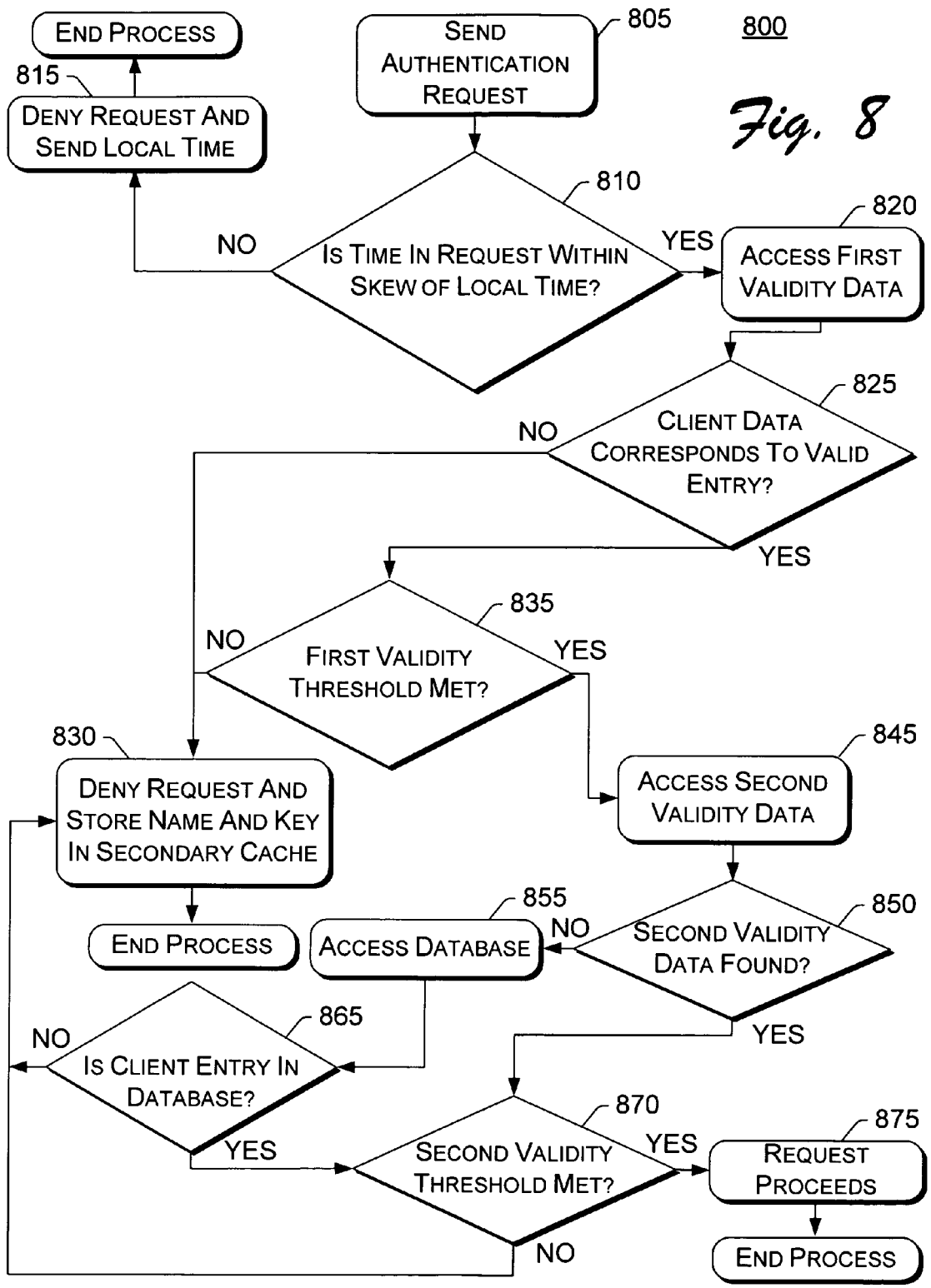

SYSTEMS AND METHODS FOR CACHING IN AUTHENTICATION SYSTEMS

TECHNICAL FIELD

The disclosure relates to security systems and to user authentication in user registration for access to computer-related material in networked systems.

BACKGROUND

As computer-based access to information systems has become more pervasive and popular, different types of authentication systems have been developed. Currently, Internet-accessible systems for numerous types of consumer transactions abound—and permit a very broad range of activities to be conveniently carried out by a user/client from a very broad range of physical locations. It is possible to file income tax returns, purchase goods and services, and to carry out banking and account servicing activities (e.g., pay bills) via broad-based and highly accessible computer networks.

As a result, sensitive information such as financial data, account numbers, identification indicia and the like need to be transmissible while preserving confidentiality via such networked media. Accordingly, there is a need to verify user identity and to preserve secrecy with respect to information and with respect to granting access to information while still permitting appropriate access to such resources and facilities.

Maintaining appropriate privacy yet still facilitating real-time access or communication involves a tradeoff between the degree of privacy protection obtained (the security of the communications process) and the degree to which communication is encumbered by the privacy protection process. For example, public key encryption can be highly secure but is so computationally intensive and thus in some sense cumbersome that it does not lend itself to direct encoding of large bodies of data for real-time interactive data exchange such as encrypted speech in conversation. The extent to which an encryption or security system presents computational obstacles to rapid exchange of data depends on both the algorithm employed and the amount of data involved in the exchange and encryption/decryption processes.

Accordingly, the kinds of privacy or encryption systems typically employed in Internet-accessible information systems are not generally among the most robust possible from an information security perspective. The amount of information a user must supply in order to gain access to a particular system is limited to an extent that provides some security but that also does not present computational obstacles to communication or require the user to have the sophistication and equipment to be able to interact via extremely high security approaches.

However, as the level of sophistication of such systems increases, the degree to which some parties find challenge in subverting such systems (e.g., "hackers") also increases. The motivations of such parties range from larceny to nihilism; the ingenuity and perseverance of such efforts has reached remarkable levels and has led to need for newly-defined criminal sanctions as well as need for improved security protocols for publicly-accessible computer systems.

Symmetric key authentication systems rely on the client and the server or system being accessed both having a predetermined Name-Key pair (or other credential) that is employed by the server to authenticate the client's request for access. A first step in most such systems is for the client to present the name in plaintext along with some "proof of key knowledge" for the key corresponding to that name. The server then uses the plaintext name to look up a corresponding key on a database, which is typically accessible via another computer. The key then may be used to verify the "proof of knowledge" proffered by the client. For example, the client key may be used to encrypt a current time, and the result transmitted to the authentication server, which decrypts the result and compares the decrypted information to current time. Examples of such systems include Kerberos (IETF RFC 1510) and Digest, as well as others.

A problem with this scheme is that the system can be attacked by sending numerous sham names to the system, possibly even by spreading a virus that causes recipient computers to transmit such sham requests. The process of looking up keys typically involves delay in order to search the database and this results in a "bottleneck" which cripples the overall authentication system when numerous sham names are used to cause the system to attempt to look up non-existent keys. As a result, even limited resources may be able to bottleneck the system such that it may be unable to respond to legitimate clients presenting legitimate credentials in order to try to gain access to the system. Such is known as a "denial of service" attack.

Accordingly, there are needs for improved techniques, systems and apparatuses for providing both more robust security (e.g., involving a larger amount of authentication data) together with rapidly and efficiently avoiding becoming too encumbered by bogus or sham requests without denying legitimate clients timely access to available facilities.

SUMMARY

An architecture and methodology for improved client authentication is described. In one aspect, a process for requesting authentication is described. The process includes computing a hash digest from first client-specific data and a time-varying function, transmitting the hash digest together with second client specific data and receiving, in response to transmitting, an indication of acceptance when the hash digest and time-varying function correspond to a valid client authentication request.

BRIEF DESCRIPTION OF THE CONTENTS

FIG. 3 is a flowchart of an exemplary process for entering information corresponding to new client data into the authentication server of FIG. 1.

FIG. 4 is a flowchart of an exemplary process for initiating a request for service from a client.

FIG. 8 is a flowchart of a fourth exemplary process for client authentication.

DETAILED DESCRIPTION

The following disclosure describes user/client authentication technologies configured to permit rapid and cryptographically robust access to secured computer facilities even in the presence of numerous other requests, which may be false or erroneous, for such access. These authentication technologies rely on rapid discrimination between valid requests and inappropriate requests. The ability to efficiently discriminate between legitimate and sham requests enables the legitimate requests to navigate relatively robust authentication. This is particularly helpful for publicly-accessible computer systems serving large numbers of clients. Such systems often have need for increasingly complex authentication requirements. Building authentication topologies to conform to these requirements and to access necessary authentication data can be a cumbersome, time consuming process that is prone to system saturation or "bottlenecking", resulting in poor responsiveness for legitimate clients. Enabling rapid identification of requests for access having a relatively high probability of legitimacy and also rapidly determining which requests are not legitimate reduces the dependence on request validation and authentication on a relatively cumbersome database searching process, thereby reducing costs and the likelihood of poor system performance or system malfunction.

Introduction

Prior to describing how an improved authentication technology discriminates between legitimate client requests for authentication and sham requests for system access, the following section addresses an environment in which such technology finds utility. The discussion of the environment provides a framework within which various elements of the improved authentication technology can be developed.

Platform Architecture

Figure 1:
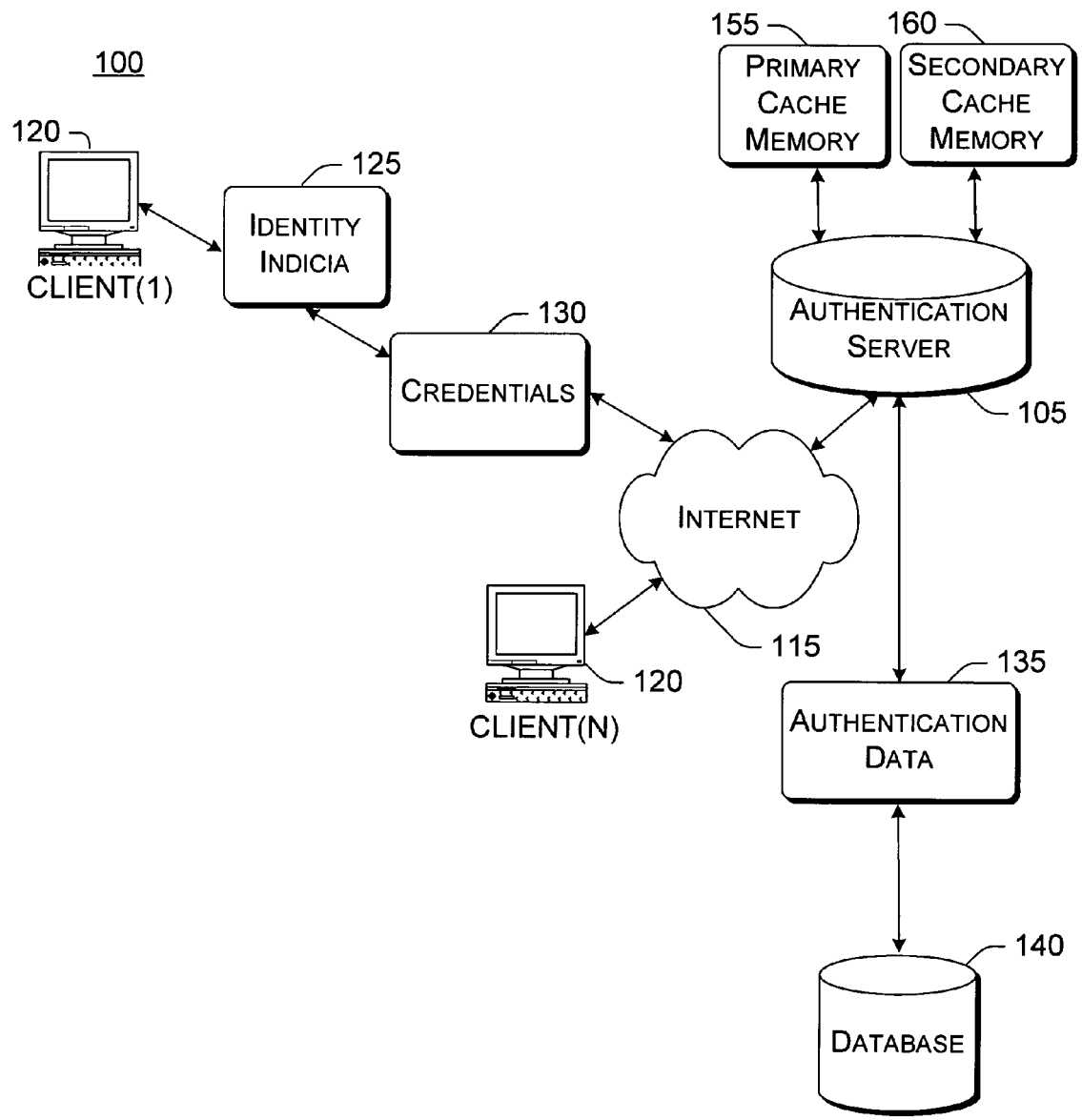
FIG. 1 shows an exemplary environment in which improved authentication technology disclosed herein may be employed.

FIG. 1 shows an exemplary environment 100 in which improved authentication technology disclosed herein is useful. The environment 100 includes an authentication server 105 having an access point coupled to a conduit 115 via which multiple clients 120 may concurrently request access by providing indicia 125 indicating identity of each client 120 along with credentials 130 corresponding to authentication data 135, i.e., proof of knowledge of privileged data such as a cryptographic key. The conduit 115 may be, for example, the Internet or any other data network.

In conventional operation, the authentication server 105, upon receiving an authentication request from a client 120, accesses a database 140 containing authentication information (such as a large number employed as a key) for numerous current clients 120. The database 140, in turn, uses the indicia 125 from the client 120 to look up the authentication data 135 corresponding to that client 120 and transmits the resultant information back to the authentication server 105. The authentication server 105 then operates on the indicia of identity 125 and credentials 130 as well as the authentication data 135 from the database 140 to confirm or refute legitimacy of the request for access from the client 120.

Computer systems, such as the authentication server 105, or a computer system used by the client 120, typically include at least some form of computer readable media. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by the computer system. Communication media typically embodies computer readable instructions, data structures, program logic or program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Any of the above or combinations of any of the above should also be included within the scope of computer readable media.

Robust Authentication

Addition of modest technological attributes to the basic system environment 100 described above permits servicing of many requests in a timely and robust fashion without requiring forbidding system equipment resources or compromise of system integrity. A primary cache memory 155 contained in or associated with the authentication server 105 can provide rapid access to relatively unforgeable data providing rapid discrimination between legitimate and sham requests for authentication, as is described below in more detail. A secondary cache memory 160 can further improve system operation.

By including a date and time for creation (and/or modification) of each client entry (e.g., name key pair) in the database 140, the cache memory 155 may be periodically updated with new entries corresponding to each client entry created or revised in the interval starting with the last time the database 140 was polled for data relevant to new or revised client entries. Relational databases such as ORACLE (e.g., Oracle9i available from Oracle Corporation) and DB2 (available from IBM) facilitate accession of data by entry date and time.

Storing the names and keys for all clients 120 in the cache memory 155 becomes prohibitive when the client list becomes large. Storing just the names of valid clients 120 reduces the amount of memory required per client 120 but also leaves the system vulnerable to denial of service attacks because a large number of requests may be made using just one valid client name. One approach for handling this situation is to create a secondary cache memory 160 that stores a list including name and key pairs for recently-used client identities. However, this presents vulnerabilities when the list may be obtained by independent means or guesswork. Additionally, the secondary cache memory 160 size may need to be so large as to render this approach economically unattractive.

One way to encrypt and also reduce the amount of data that is stored is to generate a "hash" or digest corresponding to the user name, also referred to herein as a NameHash. A hash or digest of data is a number that can be repeatedly computed from the data and that can be truncated to require less memory to store because the truncated hash digest is shorter than the data from which it is derived. Many hash algorithms result in a hash digest that does not provide enough information to permit the data from which the hash digest was derived to be computed and is not easily faked. Examples of well-known hash algorithms include the Message Digest 5 (MD5: 2 times 128 bit hashing) and the Secure Hash Algorithm (SHA: 2 times 160 bit hashing). Additionally, data in the cache memories 155 and/or 160 may be organized into hash tables, which facilitate rapid data accession (e.g., name and key pair) using the hash digest of the name as a cache key. However, other forms of data compression coupled with encryption may be employed and are to be understood to be within the scope of the term "hash" as used herein.

Forming the NameHash using a random session key derived at startup of the authentication server 105 together with the client name provides a credential that is unlikely to match data provided by a hacker or other non-client party seeking to disrupt system operation. Using only a portion of such data, such as the first group of bytes from the hash operation (e.g., the first 8 bytes), reduces the amount of data that is stored in the primary cache 155 and transmitted to or from the client without significant reduction in security.

Submission of a hash digest formed using the client name and client key (also referred to herein as a NameKeyHash) provides a credential indicating that the party transmitting such a hash digest likely has a valid relationship to a party having knowledge of the client key without compromising the client key's security.

However, the system is still vulnerable to a situation where an authentication request contains a valid name-key hash digest but the actual request includes an unrelated name, thus passing the primary cache test but still forcing a lookup operation in the database 140 for an invalid name. By storing data such as valid/invalid credential flags in the secondary cache memory 160 when a first authentication request is made and accessing these data using the associated names upon subsequent requests, such requests can rapidly be determined to be false requests when they are made using a previously-used invalid name without requiring repeated database lookup operations.

A further vulnerability of such a system arises if the attacker has the capability to "sniff" or make copies of authentication requests that are en route to the authentication server. This could permit the attacker to harvest large numbers of valid client names and NameKeyHashes that could later be employed for a denial of service attack. By forming a hash digest (TimedNameKeyHash) from the NameKeyHash and a function of time, the hash digest has a very limited "shelf life" and also does not compromise the security of the client key. The TimedNameKeyHash can be formed on the client 120 side and on the authentication server 105 side using the NameKeyHash and the same function of time (which may simply be the current time).

New Client Enrollment and Record Updating

Figure 2:
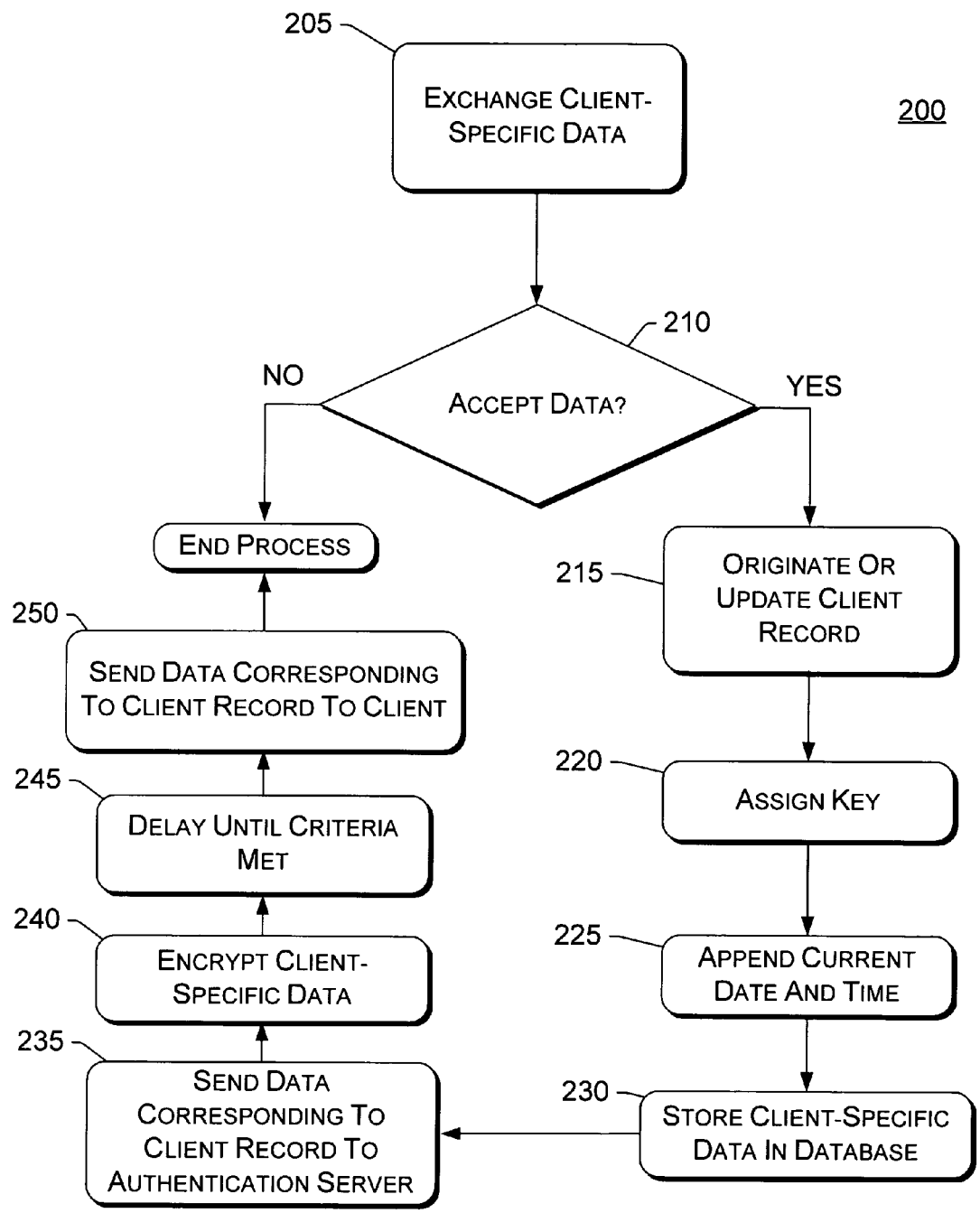
FIG. 2 is a flowchart of an exemplary process for entering new data for a client into the database and into the cache memories of FIG. 1 and for distributing new credentials to the client.

FIG. 2 is a flowchart of a process 200 for entering new data for a client 120 into the database 140 and into the cache memories 155 and/or 160 of FIG. 1 and for distributing new credentials to the client 120. The process 200 begins in a block 205.

In the block 205, client specific data such as a name is received from a source, along with an enrollment request. The client specific data may be received from client 120, or alternatively some other source such as another database or server. It will be appreciated that the block 205 may represent multiple interactions between the source and the database 140, as well as between the database 140 and an external verifier, such as another database, a banking institution and the like, as is conventional in determination of credential validity or invalidity.

In a query task 210, the process 200 determines whether to accept or reject the new or revised client data. This may be based on different validation criteria, such as credit/billing information or other identification data (e.g., driver's license number, taxpayer identification number and other client-specific data having a degree of confidentiality as well as verifiability and credibility). When the query task 210 determines that the new or revised client data are to be rejected, the process 200 terminates. When the query task 210 determines that the new or revised client data are to be accepted, control passes to a block 215.

A client record for the client is started/updated in a block 215. The client record initially contains identifying indicia such as the name associated with the client 120 and may include additional data.

In a block 220, a client key is assigned to the client 120 and is entered into the client record. The client key is typically a relatively long number unique to the client 120 or to a client group.

In a block 225, a current date and time is entered into the client record.

In a block 230, the client record is stored in the database 140.

In a block 235, data corresponding to a portion of the client record are sent to the authentication server 105. In one embodiment, such data includes the client name and a client key. In one embodiment, the client 120 may be synchronized with the authentication server 105 by including current time information in the data to be sent to the client 120.

In an optional block 240, data corresponding to a portion of the client record (e.g., the client key) are encrypted in a manner that allows the data to be decrypted by the client 120. For example, the data may be encrypted using a public key of a public-private key pair of the client 120, allowing the client 120 to decrypt the data in accordance with public key cryptography.

In an optional block 245, the process 200 waits until predetermined criteria have been met. In one embodiment, the block 245 causes the process 200 to wait for a predetermined interval after sending the data corresponding to the client record to the authentication server 105 in the block 235 and prior to sending data corresponding to the client record to the client in the block 250. For example, the authentication server 105 may be updated once a second, while the predetermined interval might be five seconds. Optionally, the client software may include the acts of block 245.

In one embodiment, the block 245 delays until some form of confirmation of communication is received in response to the acts of the block 235. Either approach allows the authentication server 105 to be able to recognize new clients or clients having recently-modified client records, such as client records that were generated or revised since a prior such request, such as a client key reset.

In a block 250, data (encrypted or plaintext) corresponding to a portion of the record are sent to the client 120. The data may include the current time and date and the client key. The enrollment process 200 then ends.

Such allows the authentication server 105 to store the data prior to transmission of authentication data to client 120, and assures that the client 120 will not be denied services inappropriately (and will thus not correspond to an invalid client flag in the secondary cache memory 160 of the authentication server 105).

Authentication Server Data Entry

FIG. 3 is a flowchart of a process 300 for entering information corresponding to new or revised client data into the authentication server 105 of FIG. 1. The process 300 begins in a block 305.

In block 305, the authentication server 105 requests new and/or updated records from the database 140. In one embodiment, the request of the block 305 is sent at predetermined intervals such as one second, and the request of the block 305 specifically requests new records generated or revised since a prior such request. Although various information may be included in the records of database 140 (e.g., level of permitted access, billing information, and so forth), only those records which involve a new client name or a change in client name, client key, or authentication to use the system are of interest in process 300 (as other information is not maintained in the primary cache memory 155 or secondary cache memory 160).

In a block 310, the authentication server 105 receives data associated with new and updated client records from the database 140. The data include a name and client key associated with the client 120.

In a block 315, first data corresponding to each of the new/revised client records are entered into the primary cache memory 155 of FIG. 1. In one embodiment, the first data include the client name and/or the client key or data derived from such. In one embodiment, the first data include the NameHash and/or the NameKeyHash. In one embodiment, the NameHash is used as a cache key for rapid lookup of the corresponding NameKeyHash.

In one embodiment, a NameHash is generated by forming a hash digest of the random session key and the client name, and a NameKeyHash is generated by forming a hash digest of the client name and the client key. In one embodiment, only a portion (the first N many bytes, e.g., the first eight bytes) of the hash digest is used for the NameHash or the NameKeyHash. In one embodiment, the hash function is a one-way hash such as a conventional HMAC.

Incorporation of the random session key in NameHash formation renders it difficult for an attacker of the authentication process to find invalid names that hash to the same value as a valid client name even when the attacker has source code access to the authentication server 105 or has knowledge of confidential aspects of the system 100. The NameHash is employed as a cache key for storage of client-specific data in the primary cache memory 155, and a later-generated version of the NameHash may be employed to rapidly retrieve the client-specific data from the first cache memory 155.

Additionally, although the process 300 is described with reference to a polling model where the authentication server 105 requests new and/or updated information from the database 140, different models may be used. For example, a "push" model may be used, where the database 140 sends the new and/or updated information to the authentication server 105 when the new and/or updated information is added to the database 140 without waiting for the authentication server 105 to request the information.

Robust Authentication

FIG. 4 is a flowchart of a process 400 for a client 120 initiating a request for service. The process 400 begins in a block 405.

In the block 405, the client 120 receives and stores authentication data. In one embodiment, the authentication data includes the client name and key. In one embodiment, the authentication data includes a NameHash formed in the authentication server 105. In one embodiment, the client appends a NameKeyHash formed from the client name and the client key with the stored authentication data. The authentication data may include information for synchronizing time between the client 120 and the authentication server 105 and may include a client key. The authentication data are received in block 405 only when a first authentication request is made during enrollment of a new client or when a client record is updated (for example, when a client has been in arrears and then changes this to a current status, or when a new client key is issued).

In a block 410, the client 120 forms an authentication request, which may include any of the client name, client key (or other proof of knowledge of the client key which can be used by the authentication server 105 to recover the key) and a current time. In one embodiment, the client 120 includes a NameHash that was previously obtained from the authentication server 105 as a part of the authentication request. In one embodiment, the client 120 forms a TimedNameKeyHash that is included as a part of the authentication request. Conventional authentication systems provide options for inclusion of additional arbitrary information together with an authentication request. For example, Kerberos includes extra pre-authentication fields that may be employed to contain information such as the TimedNameKeyHash.

In a block 415, the client 120 transmits the authentication request to the authentication server 105. In a block 420, the client receives authentication from the system when the authentication request corresponds to a valid client 120. Alternatively, the authentication request is denied when the authentication request does not correspond to a valid client. In either case, the process 400 ends.

Figure 5:
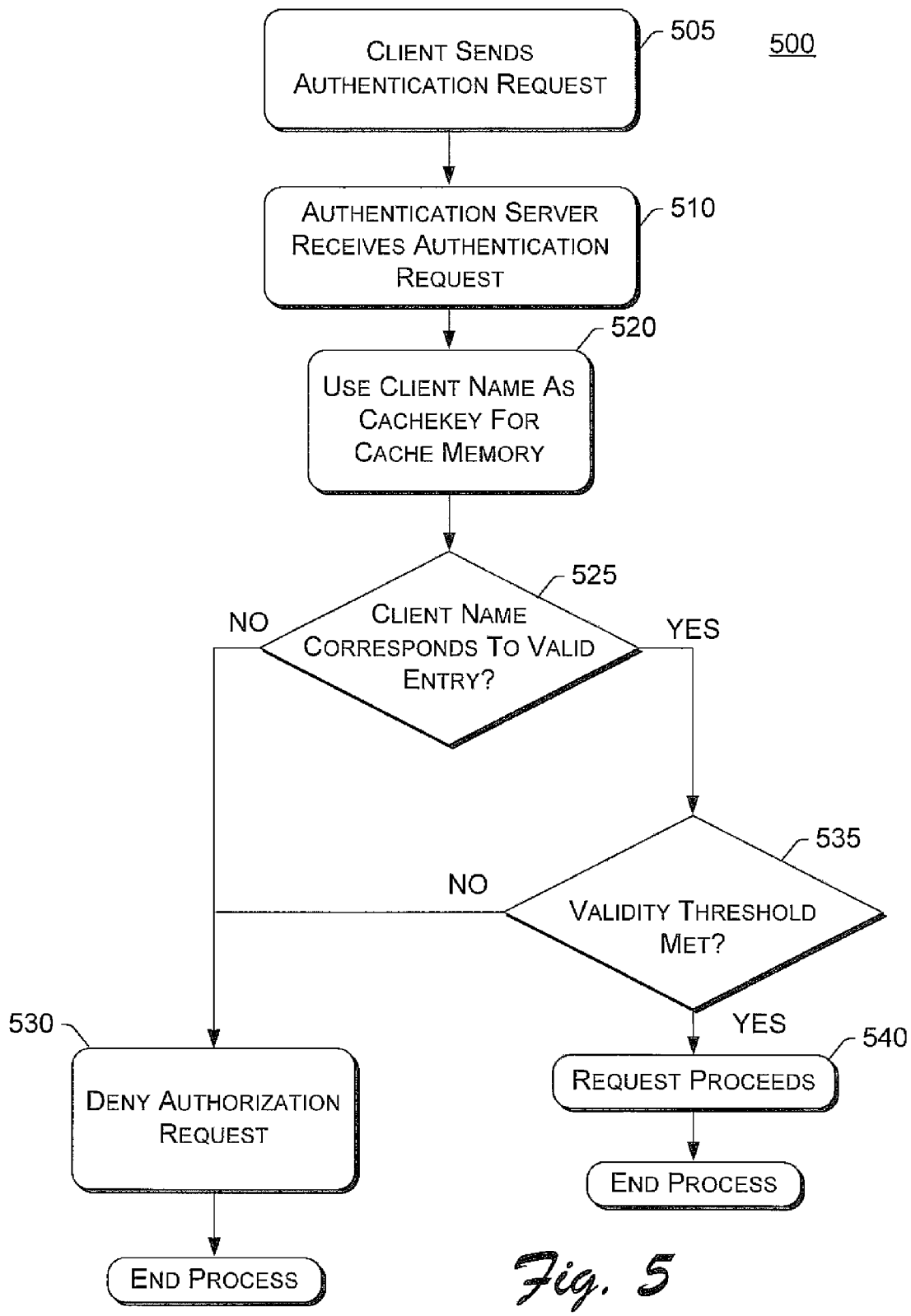
FIG. 5 is a flowchart of a first exemplary process for client authentication.

FIG. 5 is a flowchart of a first exemplary process 500 for client authentication. The process 500 begins in a block 505.

In the block 505, the client 120 sends a request for authentication to the authentication server 105 that includes client specific data such as a name or client name, which may be in plaintext, along with some "proof of key knowledge" for the client key corresponding to that name. The "proof of knowledge" may comprise a current time encrypted using the client key or a portion thereof, or may comprise data derived from the client key.

In a block 510, the authentication server 105 receives the authentication request. Control then passes to a block 520.

In the block 520, the authentication server 105 uses the name from the authentication request as a cache key to access first validity threshold data from the primary cache 155, such as a stored copy of the client key. Copies of all client names and keys are all valid principals and are stored in the cache 155, which employs the names as cache keys to access client-specific data such as copies of the associated client keys from the cache memory 155.

The cache 155 is updated frequently to maintain currency of the stored data, as is described below in more detail with reference to FIG. 2. The cache memory 155 may be constructed as a hash table or as any other data structure that allows a quick lookup process to be performed.

When the block 520 has employed the client name as a cache key to access client-specific data from the cache memory 155, control passes to a query task 525.

In the query task 525, the process 500 determines whether the client name corresponds to a valid entry in the cache memory 155. When the query task 525 determines that the client name in the authentication request does not correspond to an entry in the cache memory 155, control passes to block 530.

In the block 530, the authentication request is denied. The process 500 then ends.

When the query task 525 determines that the client name contained in the authentication request corresponds to an entry in the cache memory 155, client-specific data comprising the entry are retrieved from the cache memory 155.

In the query task 535, the process 500 compares client specific data from the authentication request to the client-specific data from the first cache memory 155 to determine whether the client specific data from the authentication request meet a first threshold of validity.

For example, the authentication server 105 locates a stored copy of the client key in the primary cache 155 that corresponds to the client name in the authentication request, using the client name as a cache key. When the query task 535 determines that the client key matches the data included in the authentication request, the first threshold of validity is met and control passes to block 540 and the authentication request proceeds conventionally. When the query task 535 determines that the client key does not match the data included in the authentication request, the first threshold of validity is not met, and control passes to the block 530. In either case, the process 500 then ends.

The process 500 facilitates rapid screening for invalid authorization requests using a simple and fast cache memory lookup process. The process 500 may be employed as the authentication process, with the only required access to the database 140 being periodic polling to obtain data relative to new or newly-modified accounts. Alternatively, the process 500 may be employed to filter out sham authentication requests prior to accessing the database 140 for further authentication processing. However, the process 500 presents difficulties when the number of credentials is large because a significant amount of cache memory 155 is needed for each cache memory 155 entry.

Figure 6:
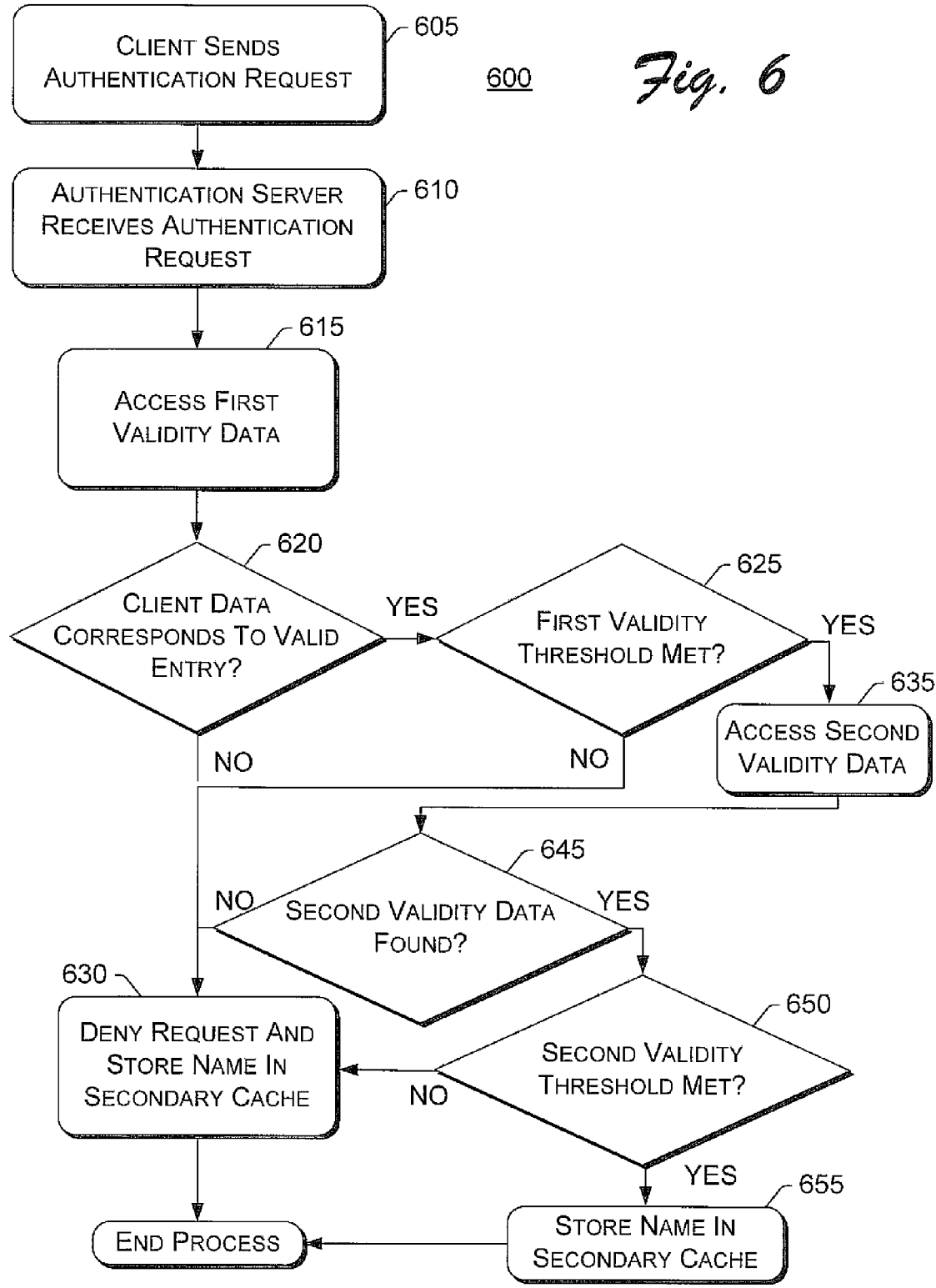
FIG. 6 is a flowchart of a second exemplary process for client authentication.

FIG. 6 is a flowchart of a second exemplary process 600 for client authentication. The process 600 begins in a block 605.

In the block 605, the client 120 sends a request for authentication to the authentication server 105 that includes client specific data (such as the client name), which may be in plaintext, and a current time encrypted using the client key (or other proof of knowledge of the client key).

In a block 610, the authentication server 105 receives the authentication request. Control then passes to a block 615.

In one embodiment, the block 615 causes the authentication server 105 to compute a NameHash using the client name from the authentication request and a RandomSessionKey formed in the authentication server at startup, and uses the NameHash or a truncated version of the NameHash as a cache key to access first validity threshold data from the primary cache 155, such as a stored copy of the NameHash. The NameHash is computed as NameHash=First X bytes of HMAC(RandomSessionKey, Name).

Forming the primary 155 and secondary 160 caches as hash tables, and using the NameHash as a cache key for the primary cache 155 and the client name as a cache key for the secondary cache 160, can increase the speed and throughput of the authentication process 600. In one embodiment, the NameHash for all valid clients is stored in the primary cache memory 155 at all times after entry thereof during the updating process.

Other types of rapid access cache memories may also be employed. When the block 615 has used the data from the authorization request to try to access data from the primary cache 155, control passes to a query task 620.

In the query task 620, the process 600 determines whether the primary cache 155 contains an entry corresponding to data contained in the authentication request. If the query task 620 determines that the primary cache does not contain such an entry, control passes to a block 630 (discussed later below).

When the query task 620 determines that the primary cache 155 does contain an entry corresponding to data contained in the authentication request, control passes to a query task 625.

In the query task 625, the process 600 compares client specific data to the data from the first cache memory 155 to determine when the client specific data meet a first threshold of validity.

In one embodiment, the authentication server 105 locates a stored copy of the client name or NameHash in the primary cache 155 in the block 620 that corresponds to the client name in the request. When the query task 625 determines that the client name matches the data included in the authentication request, the first threshold of validity is met, and when the query task 625 determines that the client name does not match the data included in the authentication request, the first threshold of validity is not met. When the query task 625 determines that the credentials offered in the authentication request do not meet the first threshold of validity, control passes to the block 630.

In the block 630, the name and client key associated with the denied request are stored in the secondary cache memory 160 together with an appropriate validity flag. The client name is stored in the secondary cache along with a "valid" indication, whether or not the client key or proof of key knowledge matches the data in the database 140. This avoids later rejection of a valid client whose "proof of knowledge" of the client key was inaccurate but which the client 120 may be able to correct on a subsequent authentication request. A time and date may also be stored in the secondary cache memory 160 with the other entries. The authentication request is denied and the process 600 then ends. The secondary cache 160 is used to store validity/invalidity flags and name key pairs for recent authentication requests. When the secondary cache memory 160 is already full, then an entry in the second cache memory 160 can be evicted using any of a variety of protocols (e.g., according to a least recently used or pseudo least recently used algorithm).

When the query task 625 determines that the credentials offered in the authentication request meet the first threshold of validity, control passes to a block 635.

In the block 635, the process 600 attempts to obtain second validity data. The second validity data either are obtained from the secondary cache memory 160 or from the database 140 (when the secondary cache memory has no corresponding record), as is discussed below in more detail with reference to blocks 845, 850, 855 and 865 of FIG. 8. Control then passes to a query task 645.

In the query task 645, the process 600 checks to see if the second validity data were located. When the query task 645 determines that the second validity data were located, control passes to a query task 650. When the query task 645 determines that the second validity data were not located in either the secondary cache 160 or in the database 140, control passes to block 630.

In the query task 650, the process 600 compares the client specific data to the data from the second cache memory 160 to determine whether the client specific data meet a second threshold of validity. For example, the name associated with the authentication request is used as a cache key to look up the associated client key and validity flag in the secondary cache memory 160 (e.g., the name is used as a cache key to obtain the associated data).

When the query task 650 determines that the client-specific data do not meet the second threshold of validity, e.g., the name corresponds to an invalid validity flag included in the authentication request, control passes to the block 630, described above. The process 600 then ends.

When the query task 650 determines that the name corresponds to a valid validity flag in the secondary cache memory 160, control passes to a block 655.

In the block 655, the name and key pair are stored in the secondary cache 160 along with a current time and date and the validity flag is set to "valid". The client name is stored in the secondary cache along with a "valid" indication, whether or not the client key matches. This avoids later rejection of a valid client whose "proof of knowledge" of the client key was inaccurate but which the client 120 may be able to correct on a subsequent authentication request. The process 600 then ends.

Figure 7:
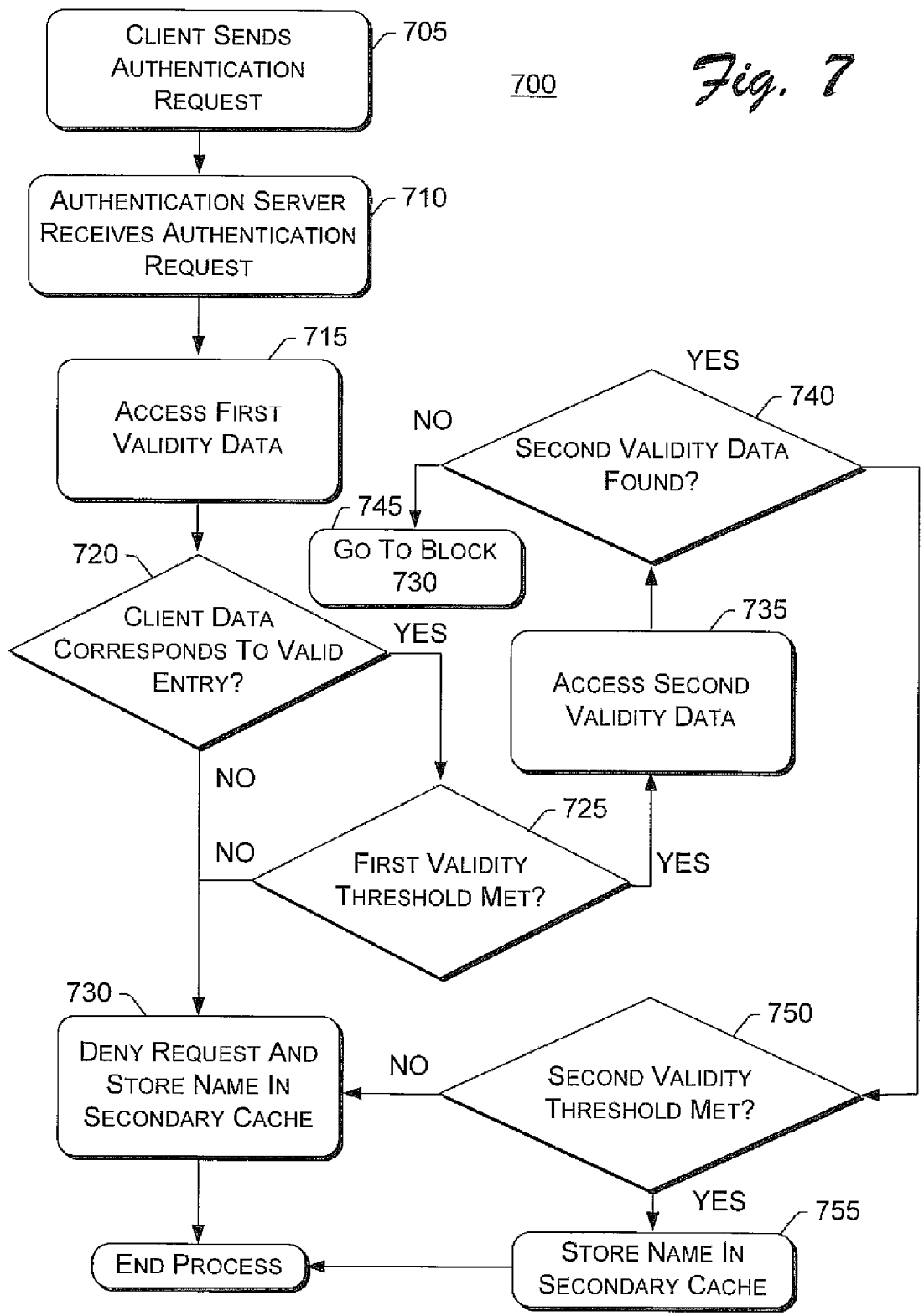
FIG. 7 is a flowchart of a third exemplary process for client authentication.

FIG. 7 is a flowchart of a third exemplary process 700 for client authentication. The process 700 begins in a block 705.

In the block 705, the client 120 sends a request for authentication to the authentication server 105 that includes client specific data such as a name or client name, a client key (or other proof of knowledge of the client key), and a NameKeyHash or a truncation of a NameKeyHash. In one embodiment, the hashes are computed on the client side using a conventional one-way hash, such as the HMAC algorithm. The NameKeyHash is computed as NameKeyHash=First X bytes of HMAC(Key, Name).

In a block 710, the authentication server 105 receives the authentication request. Control then passes to a block 715.

In the block 715, the authentication server 105 computes a NameHash from the name in the client request to try to access first validity threshold data from the primary cache 155. In one embodiment, the authentication server computes the NameHash using the random session key and the name from the authentication request and employs the NameHash as a cache key to obtain associated information, such as a stored NameKeyHash. The NameHash is computed as NameHash=First X bytes of HMAC(RandomSessionKey, Name). Alternatively, the NameKeyHash is employed as a cache key. When the block 715 has tried to obtain the first validity threshold data from the primary cache 155, control passes to a query task 720.

In the query task 720, the process 700 determines whether the primary cache 155 contains an entry corresponding to data contained in the authentication request. When the query task 720 determines that the primary cache does not contain such an entry, control passes to a block 730 (discussed later below).

When the query task 720 determines that the primary cache 155 does contain an entry corresponding to data contained in the authentication request, control passes to a query task 725.

In the query task 725, the process 700 compares client specific data to the data from the first cache memory 155 to determine when the client specific data meet a first threshold of validity.

In one embodiment, the authentication server 105 locates a NameKeyHash in the primary cache 155 in the block 720 that corresponds to the name in the request, using the NameHash (either contained in the request or computed in the authorization server 105) as a cache key. The NameKeyHash retrieved from the first cache memory 155 is then compared to the NameKeyHash from the authentication request in the query task 725. When the query task 725 determines that the two NameKeyHash values match, the first threshold of validity is met, and when the query task 725 determines that the two NameKeyHash values do not match, the first threshold of validity is not met. Alternatively, the NameKeyHash may be used as a cache key to look up the NameHash and then match the retrieved NameHash to a NameHash included in the authorization request.

When the query task 725 determines that the credentials offered in the authentication request do not meet the first threshold of validity, control passes to a block 730.

In the block 730, the name associated with the denied request is stored in the secondary cache memory 160 and an appropriate validity flag. The client name is stored in the secondary cache along with a "valid" indication, whether or not the client key or proof of key knowledge matches the data in the database 140. This avoids later rejection of a valid client whose "proof of knowledge" of the client key was inaccurate but which the client 120 may be able to correct on a subsequent authentication request. A time and date may also be stored in the secondary cache memory 160. The authentication request is denied and the process 700 then ends.

When the query task 725 determines that the credentials offered in the authentication request meet the first threshold of validity, control passes to a block 735.

In the block 735, the process 700 obtains second validity data. The data either are obtained from the secondary cache memory 160 or from the database 140 (when the secondary cache memory has no corresponding record), as is discussed below in more detail with reference to blocks 845, 850, 855 and 865 of FIG. 8.

In a query task 740, the process 700 checks to see if the second validity data were located. When the query task 740 determines that the second validity data were located, control passes to a query task 750. When the query task 740 determines that the second validity data were not located in either the secondary cache 160 or in the database 140, control passes to block 730 via block 745.

In the query task 750, the process 700 compares the client specific data to the data from the second cache memory 160 to determine whether the client specific data meet a second threshold of validity. For example, the name associated with the authentication request is used as a cache key to look up the associated client key and validity flag in the secondary cache memory 160 (e.g., the name is used as a cache key to obtain the associated data). When the query task 750 determines that the client-specific data do not meet the second threshold of validity, e.g., the name corresponds to an invalid validity flag, control passes to the block 730, described above.

When the query task 750 determines that the name corresponds to a valid validity flag, control passes to a block 755.

In the block 755, the authentication server 105 stores the client name and key in the secondary cache memory 160 along with an appropriate validity flag and accepts the request. The client name is stored in the secondary cache along with a "valid" indication, whether or not the client key matches. This avoids later rejection of a valid client whose "proof of knowledge" of the client key was inaccurate but which the client 120 may be able to correct on a subsequent authentication request. The process 700 then ends.

FIG. 8 is a flowchart of a fourth exemplary process 800 for client authentication. The process 800 begins in a block 805.

In the block 805, the client 120 sends a request for authentication to the authentication server 105 that includes client specific data such as a name or client name, a client key (or other proof of knowledge of the client key), a TimedNameKeyHash or a truncated version of same, and a current time. In one embodiment, the client specific data includes the client name, which may be in plaintext. In one embodiment, the TimedNameKeyHash is computed on the client side using a conventional one-way hash, such as the HMAC algorithm mentioned above. The TimedNameKeyHash is computed as TimedNameKeyHash=first X bytes of HASH(NameKeyHash, CurrentTime). The NameKeyHash is computed as NameKeyHash=First X bytes of HMAC(Key, Name).

In a query task 810, the process 800 determines if the current time supplied in the authentication request is close to the current time used in the authentication server 105.

When the query task 810 determines that the current time in the authentication request differs from the current authentication server time by more than a predetermined time skew, control passes to a block 815. A typical acceptable time skew is about two minutes.

In the block 815, the authentication server 105 denies the authentication request. In the block 815, the authentication server also optionally sends the client the current time such that the client can build a valid authentication request using the current time, and the process 800 ends.

When the query task 810 determines that the current time in the authentication request does not differ from the current authentication server time by more than the allowed time skew, control passes to a block 820.

In the block 820, the authentication server 105 uses the name to try to access first validity threshold data from the primary cache 155. In one embodiment, the authentication server computes a NameHash using the random session key and the name from the authentication request and employs the NameHash as a cache key to obtain associated information, such as a stored NameKeyHash or truncated version thereof. The NameHash is computed as NameHash=First X bytes of HMAC(RandomSessionKey, Name). Alternatively, the NameKeyHash is computed and employed as a cache key. When the block 820 has tried to obtain the first validity threshold data from the primary cache 155, control passes to a query task 825.

In the query task 825, the process 800 determines whether the NameHash corresponds to an entry in the primary cache 155 and provides related data such as a stored copy of the NameKeyHash.

When the query task 825 determines that no valid entry exists in the primary cache memory 155 for the cache key from the authorization request, control passes to a block 830.

In the block 830, the authentication request is denied and the name associated with the denied request is stored in the secondary cache memory 160, along with an appropriate validity flag. The client name is stored in the secondary cache along with a "valid" indication, whether or not the client key or proof of key knowledge matches the data in the database 140. This avoids later rejection of a valid client whose "proof of knowledge" of the client key was inaccurate but which the client 120 may be able to correct on a subsequent authentication request. A time and date may also be stored in the secondary cache memory 160. The authentication request is denied and the process 800 then ends.

When the query task 825 determines that an entry exists in the primary cache memory 155 corresponding to the NameHash computed from or received with the authentication request, control passes to a query task 835.

In the query task 835, the process 800 compares client specific data from the authentication request to the data from the first cache memory 155 to determine whether the client specific data meet a first threshold of validity.

In one embodiment, the authentication server 105 uses a NameKeyHash or a truncated version thereof from the primary cache 155 to compute a TimedNameKeyHash using the time supplied in the authentication request. The computed TimedNameKeyHash is then compared to a TimedNameKeyHash contained in the authentication request. If the query task 835 determines that the computed TimedNameKeyHash matches the TimedNameKeyHash contained in the authentication request, the first threshold of validity is met, and when the query task 835 determines that there is no match, the first threshold of validity is not met.

When the query task 835 determines that the credentials offered in the authentication request do not meet the first threshold of validity, control passes to the block 830. When the query task 835 determines that the credentials offered in the authentication request meet the first threshold of validity, control passes to the block 845.

In the block 845, the authentication server 105 uses the client name to try to access second validity threshold data from the secondary cache 160. In one embodiment, the authentication server 105 uses the name from the authentication request as a cache key to obtain associated information, such as a stored copy of the client key and a validity flag. When the block 845 has tried to obtain the second validity threshold data from the secondary cache 160, control passes to a query task 850.

In the query task 850, the process 800 determines whether or not second validity data were located in the second cache memory 160. When the query task 850 determines that secondary validity data are available from the secondary cache memory 160, control passes to a query task 870. When the query task 850 determines that no second validity data are available from the second cache memory 160 (e.g., a cache miss occurs), control passes to a block 855.

In the block 855, the database 140 is accessed to try to obtain any client record corresponding to the client name in the authorization request. Control then passes to a query task 865.

In the query task 865, the process 800 determines whether a database entry corresponding to the client name was found in the database 140 in the block 855. If the query task 865 determines that no such entry exists in the database 140, control passes to the block 830, and the name key pair from the authentication request is then stored in the second cache memory 160 with the appropriate validity flag. If the second cache memory 160 is already full, an entry in the second cache memory 160 can be evicted using any of a variety of protocols (e.g., according to a least recently used or pseudo least recently used algorithm). When the query task 865 determines that such an entry exists, control passes to the query task 870.

The query task 870 compares the client specific data to the data from the database 140 (e.g., from query task 865) or from the authorization request (e.g., from query task 850) to determine whether the client specific data meet a second threshold of validity. For example, the name and proof of knowledge of the client key associated with the authentication request is compared to the associated client key and validity flag obtained from the secondary cache memory 160 or to a client name and client key obtained from the database 140.

When the query task 870 determines that the client-specific data do not meet the second threshold of validity, e.g., the name corresponds to an invalid validity flag, control passes to the block 830, described above.

When the query task 870 determines that the name corresponds to a valid validity flag and that the name corresponds to the same key as was included in the authentication request, control passes to a block 875.

In the block 875, the authentication server 105 accepts the request. The process 800 then ends.

The processes 200, 300, 400 and 500, 600, 700 and/or 800 permit the authentication server 105 to quickly screen out many invalid requests for authentication without forcing the database 140 to be invoked, and thus renders the authentication request process more robust, even when confronted with massive numbers of false requests for authentication. The processes 200, 300, 400 and 500, 600, 700 and/or 800 reduce the amount of data that need to be stored in the cache memories 155 and/or 160 in order to quickly weed out many invalid authentication requests, which facilitates rapidity of authentication request screening.

Additionally, such avoids investment in large amounts of hardware to try to increase the speed of conventional authentication systems. The disclosed authentication processes also sidestep a situation where an originator of such false requests accepts the challenge to muster or commandeer additional resources in an attempt to bottleneck the system.

Conclusion

Although the disclosure has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. A process for verification of a client authentication request by a server which can decrease problems associated with sham authentication requests, the process comprising:
    receiving, in the server, a client authentication request including client-specific data;
    comparing the client specific data to data stored in a first cache memory coupled to the server to determine whether the client specific data meet a first threshold of validity;
    if the client specific data meet the first threshold of validity, proceeding with the authentication process; and
    if the client specific data do not meet the first threshold of validity, then storing in a second cache memory a portion of the client specific data and an indication that the client specific data do not correspond to a valid client, wherein the portion of the client specific data and the indication stored in the second cache memory identify a client name associated with the client authentication request and associate the client name with a negative indication of validity regardless of whether the client specific data includes valid proof of knowledge of privileged data, and then terminating the verification process.

2. The process of claim 1, wherein:
    proceeding with the authentication process comprises comparing the client specific data with data stored in the second cache memory to determine whether the client specific data meet a second threshold of validity and whether the client specific data correspond to an identity previously determined to be valid or invalid;
    if the client specific data meet the second threshold, transmitting a request for verification to a database containing client specific data; and
    if the client specific data correspond to an identity previously determined to be invalid, terminating the authentication request.

3. The process of claim 1, wherein receiving comprises receiving data including one or more of: a name, a NameHash, a truncation of a NameHash, a NameKeyHash, a truncation of a NameKeyHash, a TimedNameKeyHash, a truncation of a TimedNameKeyHash or a time.

4. The process of claim 1, wherein receiving comprises receiving a TimedNameKeyHash.

5. The process of claim 1, wherein receiving comprises receiving a TimedNameKeyHash and a current time.

6. The process of claim 1, wherein comparing the client specific data to data stored in the first cache memory comprises comparing a TimedNameKeyHash contained in the authentication request to a function of a stored NameKeyHash and a current time.

7. The process of claim 1, wherein receiving client specific data includes receiving a current time, and further comprising determining whether the received current time disagrees with another current time used by the authentication server, and if the received current time and the other current time disagree, sending the other current time to an originator of the authentication request.

8. A computer system comprising:
    an authentication server; and
    a first cache memory coupled to the authentication server, wherein the authentication server is configured to perform a method, the method comprising:
        receiving a client authentication request including client-specific data;
        comparing the client specific data to data stored in the first cache memory coupled to the authentication server to determine whether the client specific data meet a first threshold of validity;
        if the client specific data do not meet the first threshold of validity, terminating authentication and denying the authentication request;
        if the client specific data meet the first threshold of validity, proceeding with authentication by comparing the client specific data with data stored in a second cache memory to determine whether the client specific data meet a second threshold of validity and whether the client specific data correspond to an identity previously determined to be valid or invalid;
        if the client specific data meet the second threshold, transmitting a request for verification to a database containing client-specific data; and
        if the client specific data correspond to an identity previously determined to be invalid, terminating the authentication request.

9. The computer system of claim 8, wherein the authentication server is configured to employ a first, plaintext portion of the client-specific data as a cache key to obtain related encrypted client-specific data from the first cache memory.

10. The computer system of claim 8, wherein the authentication server is further configured to perform steps comprising: storing at least a portion of the client specific data in the second cache memory along with an indication that the client specific data do not correspond to a valid client if the client specific data do not meet the first threshold.

11. The computer system of claim 8, wherein the client-specific data includes a NameKeyHash that is also a function of time.

12. The computer system of claim 8, wherein the client-specific data includes TimedNameKeyHash.

13. The computer system of claim 8, wherein the client specific data includes a TimedNameKeyHash and a current time is included with the client-specific data.

14. The computer system of claim 8, wherein the client specific data stored in the first cache memory comprises a NameKeyHash, and wherein the authentication server is further configured to perform steps comprising: forming a TimedNameKeyHash from the NameKeyHash and comparing the formed TimedNameKeyHash to a portion of the client-specific data.

15. The computer system of claim 8, wherein the client specific data includes a current time, and wherein the authentication server is further configured to perform steps comprising: determining whether the received current time disagrees with another current time, the other current time being used by the authentication server, and if the received current time and the other current time disagree, sending the other current time to an originator of the authentication request.

16. A process for verification of a client authentication request by a server which can decrease problems associated with sham authentication requests, the process comprising:

receiving, in the server, a client authentication request including client-specific data comprising a name or hash of the name along with a client key or a proof of knowledge which identifies the client key;

comparing the client-specific data to data stored in a first cache memory coupled to the server to determine whether the client-specific data meet a first threshold of validity, wherein the first cache memory stores names and keys of valid clients, and wherein the first cache memory uses the name or the hash of the name as a cache key to access the first cache memory;

if the client-specific data meet the first threshold of validity, the first threshold of validity being met when the name and the client key identified in the client authentication request correspond to a valid entry in the first cache memory, proceeding with the authentication process; and if the client-specific data do not meet the first threshold of validity, then storing the name, the client key, and validity/invalidity indicators in a second cache memory, wherein the name stored in the second cache memory is associated with a validity indication regardless of whether the client key or the proof of knowledge for the client key matches data in an associated authentication database, and terminating the verification process.

17. A process for authenticating a user which can decrease problems associated with sham authentication requests, the process comprising:

receiving an authentication request including first client specific data comprising at least one of a client name and proof of knowledge of a client key;

computing a NameHash using the received client name and a random session key;

using data corresponding to the NameHash as a cache key to access first validity threshold data from a first cache memory;

comparing the first validity threshold data to the first client specific data; and if the first client specific data do not meet the first threshold of validity, then storing a portion of the client specific data in a second cache memory along with an indication that the client specific data do not correspond to a valid client, the portion of the client specific data stored in the second cache memory identifying a client name associated with the client authentication request and associating the client name with a validity indication regardless of whether the client specific data included valid proof of knowledge of privileged data, and then terminating the verification process.

18. The process of claim 17, further comprising, when the first validity data do not match the first client data, storing the client key and a CredentialInvalidFlag in the second cache memory.

19. The process of claim 17, further comprising, when the first validity data do match the first client data, employing the client name as a cache key to access second client validity data from the second cache memory.

20. The process of claim 17, further comprising, when the first validity data do match the first client data, employing the client name as a cache key to access second client validity data from the second cache memory, wherein the second client validity data comprise a stored copy of a client key.

21. The process of claim 17, wherein using data corresponding to the NameHash as a cache key comprises using a truncation of the NameHash to access first validity threshold data from the first cache memory.

\* \* \* \* \*